United States Patent Office.

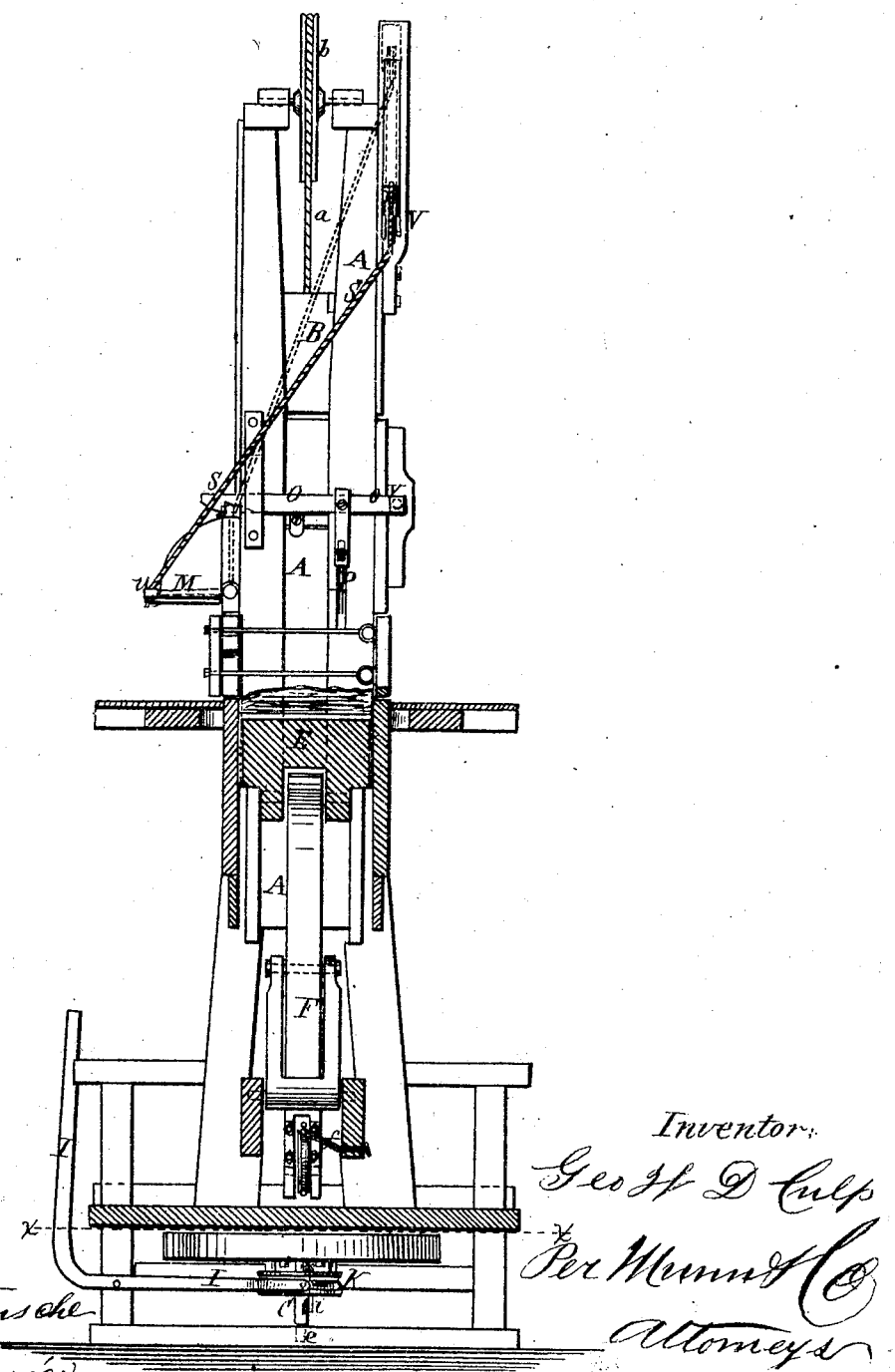

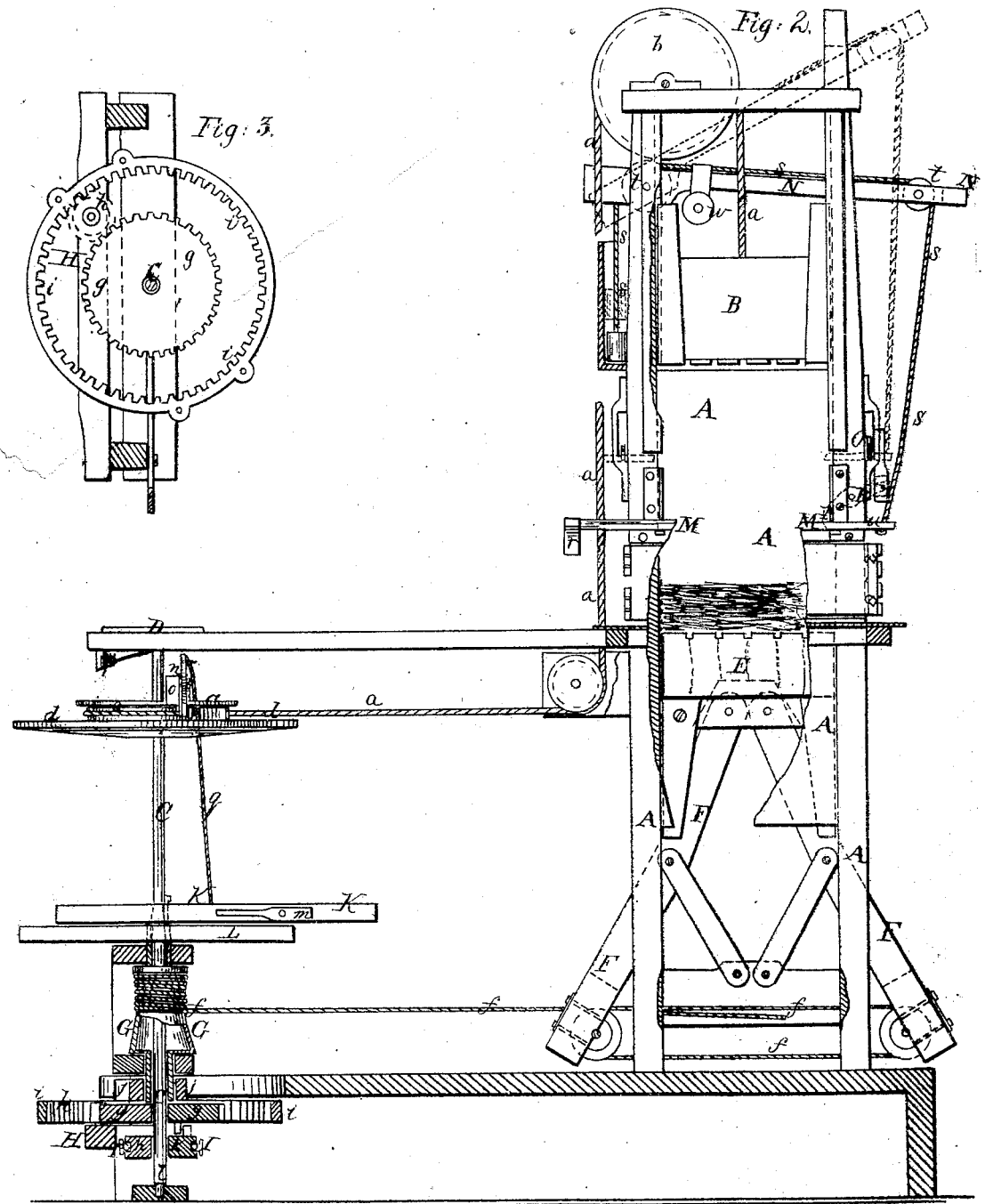

GEORGE W. D. CULP, OF EAST ENTERPRISE, INDIANA.

Letters Patent No. 74,054, dated February 4, 1868.

IMPROVEMENT IN HAY-PRESS.

*The Schedule referred to in these Letters Patent and making part of the same.*

TO ALL WHOM IT MAY CONCERN:

Be it known that I, GEORGE W. D. CULP, of East Enterprise, in the county of Switzerland, and State of Indiana, have invented a new and improved Hay-Press; and I do hereby declare that the following is a full, clear, and exact description thereof, which will enable others skilled in the art to make and use the same, reference being had to the accompanying drawings, forming part of this specification, in which—

Figure 1 represents an end view, partly in section, of my improved press.

Figure 2 is a side elevation, partly in section, of the same.

Figure 3 is a detail horizontal section of the same, taken on the line $x\ x$, fig. 1.

Similar letters of reference indicate like parts.

This invention relates to an improved beater-press, which is so arranged that the motion of the follower can be reversed whenever desired without reversing the motion of the horses, and that, furthermore, the beater or the follower, or both, can be thrown out of gear whenever desired, without stopping the horses, and in which an automatic self-opening and closing feed-door is arranged in such a manner that when the beater ascends it will be closed, while it will open as soon as the beater is down.

The invention consists, first, in the use of an upright shaft, on the upper end of which a wheel is mounted for operating the beater in the usual manner, while the lower end of the said shaft passes loosely through a capstan, by which the follower is operated, thereby permitting the shaft and capstan to revolve in opposite directions, or the shaft to revolve without moving the capstan, as may be desired. A cog-wheel fits loosely around the shaft, but can be thrown in gear with the same by means of a sliding-clutch or other suitable device. The gear-wheel meshes into a pinion, and the latter into a toothed wheel, which is attached to the capstan, so that by the clutch the capstan and shaft are connected, but turn in opposite directions. The sweep to which the horses are attached is secured to the shaft, and when the clutch is down it turns only the shaft. A crank is arranged on the sweep, whereby it can be connected with the capstan, in which case the latter and the shaft will revolve in the same direction. The device for operating the beater can be easily thrown out of gear, so that the shaft can be revolved without operating the beater, and be connected with the follower or not, as may be desired.

My invention consists, further, in the manner of operating the feed-door in such a manner that it will be closed as soon as the beater is raised and opened as soon as the beater falls down.

A represents the frame of a beater-press made of wood, and of the usual shape. B is the beater, which is suspended from a rope, $a$, which passes over a pulley, $b$, and the end of which is attached to a slide, $c$, which fits into a circular groove in a disk, $d$. The latter is mounted on a vertical shaft, C, the lower end of which rests upon a step, $e$, while its upper end is guided in a horizontal bar, D. E is the follower of the press, to the lower end of which two arms F F are pivoted, which are operated by a rope, $f$. The latter is connected with a capstan, G, which fits loose around the shaft C, as is clearly shown in fig. 2. Around the lower end of the shaft C is arranged, so as to turn loose thereon, a cog-wheel, $g$. The same meshes into a pinion, $h$, which is secured to the stationary frame H, in which the step $e$ is arranged. The teeth of the pinion $h$ mesh into those of a wheel, $i$, which is provided with internal gear, as is clearly shown in fig. 3, and which is firmly secured to arms $j\ j$, which project from the capstan. A clutch, $k$, which slides on a feather, $l$, on the shaft C, can be thrown against the face of the wheel $g$, by means of a lever, I, (see fig. 1,) so that the same will thereby be connected and revolve with the shaft, and will consequently carry the capstan around with it, when the shaft C is revolved. K is an arm, which projects from the shaft C, and which serves as a sweep or lever for operating the beater and follower. A catch, $m$, is attached to it, whereby it can be connected with an arm, L, which projects from the capstan. The slide $c$ on the disk $d$ strikes against the weighted end of a lever, $n$, which is pivoted to a bar, $o$, which is secured to the disk $d$, so that the slide will be carried around with the disks, and will thereby wind the rope $a$ upon the same, thereby raising the beater. As soon as the lever $n$ strikes against a fixed incline, $p$, it will release the slide, and the beater will drop down. By pulling a rope, $q$, which is secured to the outer end of the lever $n$, the same can be disengaged from the slide $c$ whenever desired. Thus the shaft C can be revolved without operating the beater or follower, the clutch $k$ being down and the rope $q$ stretched.

The shaft C can be revolved and operate the beater only, the clutch k being still down. The shaft C being revolved, can be made to operate both the beater and follower by elevating the clutch. The motion of the capstan can be reversed by lowering the clutch and connecting the arms K and L by means of the catch m. M is the feed-door, which is hinged at its lower edge, and connected with a weight, r, which has the tendency to always keep the door open. A cord, s, which passes over pulleys t, that are attached to a lever, N, one end of which is pivoted to the frame, as shown, is weighted at one end, its other end being secured to an arm, u, projecting from the door M. Thus the weight r has the tendency to keep the door M open at all times, while the weight on the cord s tries to keep the door closed.

O O are two hook-shaped catches, which are pivoted to the sides of the frame A, and which, when the feed-door is closed, fit over its upper edge, and prevent the same from being opened. These bars O are connected by a bar, v, so that they move simultaneously. w is a friction-roller attached to the under side of the lever N, so that when the beater is raised the said roller will strike against its top and will elevate the same, as is clearly shown by red lines in fig. 2. The rope s will thereby be stretched and the door closed, and the hooks O O be engaged over the top edge of the door M. P is an elbow-shaped lever, which is pivoted in the side of the box A, and the end of one arm of which is pivoted to one of the arms O. Its elbow or corner projects somewhat into the inside of the box. As soon as the beater drops, the lever N will drop down again into its normal position, which is shown in fig. 2, and the rope s will thereby be slackened, so that the door M is only kept closed by the catches O. As soon as the beater is down, it presses the inward-projecting part of the arm P out, and thereby raises both the catches O from the door, so that the latter can be opened by the weight r.

Having thus described my invention, what I claim as new, and desire to secure by Letters Patent, is—

1. The shaft C, when provided with a loose gear-wheel, g, and with a sliding clutch, k, in combination with the capstan G, all made and operating so that the shaft can be revolved with or without the capstan, as may be desired.

2. The disk d on the shaft C, for operating the beater, in combination with the capstan G and cogs g, h, and i, for operating the follower, all made as set forth.

3. The catch m on the sweep k, in combination with the arm L on the capstan G, all made and operating substantially as herein shown and described.

4. The device for automatically opening the feed-door M by the downward motion of the beater, consisting of the elbow P, catches O, and weight r, all made and operating substantially as herein shown and described.

5. The device for automatically closing the feed-door by the upward motion of the beater, consisting of the lever N, weighted cord g, and catches O, all made and operating substantially as herein shown and described.

GEO. W. D. CULP.

Witnesses:
   O. R. STIVERS,
   C. F. GREEN.